United States Patent
Bemment

(10) Patent No.: US 11,280,274 B2
(45) Date of Patent: Mar. 22, 2022

(54) GAS TURBINE ENGINE

(71) Applicant: ROLLS-ROYCE PLC, London (GB)

(72) Inventor: Craig W Bemment, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 16/992,211

(22) Filed: Aug. 13, 2020

(65) Prior Publication Data

US 2021/0108570 A1    Apr. 15, 2021

(30) Foreign Application Priority Data

Sep. 12, 2019  (GB) .................................. 1913195

(51) Int. Cl.
| | |
|---|---|
| *F02C 7/36* | (2006.01) |
| *F02C 3/113* | (2006.01) |
| *F02K 3/06* | (2006.01) |
| *F02C 7/06* | (2006.01) |

(52) U.S. Cl.
CPC ............... *F02C 7/36* (2013.01); *F02C 3/113* (2013.01); *F02K 3/06* (2013.01); *F02C 7/06* (2013.01); *F05D 2220/36* (2013.01); *F05D 2260/40311* (2013.01)

(58) Field of Classification Search
CPC .... F02C 7/36; F02C 3/113; F02C 7/06; F02K 3/06; F05D 2220/36; F05D 2260/40311
See application file for complete search history.

(56) References Cited

U.S. PATENT DOCUMENTS

| | | | | |
|---|---|---|---|---|
| 5,209,644 | A * | 5/1993 | Dorman | F01D 5/145 |
| | | | | 416/235 |
| 8,678,743 | B1 * | 3/2014 | Sheridan | F02C 7/36 |
| | | | | 415/1 |
| 2004/0255590 | A1 * | 12/2004 | Rago | F02C 7/32 |
| | | | | 60/772 |
| 2007/0130959 | A1 * | 6/2007 | Linet | F02C 3/113 |
| | | | | 60/802 |
| 2008/0223135 | A1 | 9/2008 | Blanchard et al. | |
| 2012/0087780 | A1 * | 4/2012 | Suciu | F04D 29/563 |
| | | | | 415/159 |
| 2013/0149113 | A1 * | 6/2013 | Kohlenberg | F01D 15/12 |
| | | | | 415/122.1 |
| 2016/0369702 | A1 * | 12/2016 | Otto | F04D 25/028 |

(Continued)

FOREIGN PATENT DOCUMENTS

WO    2019038510 A1    2/2019

OTHER PUBLICATIONS

Feb. 5, 2021 Search Report issued in European Patent Application No. 20190605.4.

(Continued)

*Primary Examiner* — Shafiq Mian
(74) *Attorney, Agent, or Firm* — Oliff PLC

(57) ABSTRACT

There is provided a gas turbine engine comprising a low pressure shaft and a high pressure shaft; wherein the low pressure shaft connects a fan to a fan drive turbine, and the high pressure shaft connects a high pressure turbine to a compressor section. The low pressure shaft and the high pressure shaft are arranged such that when operating at idle the idle shaft speed ratio is greater than 6.05. The idle shaft speed ratio is the ratio of the speed of the high pressure shaft to the speed of the low pressure shaft at idle conditions.

19 Claims, 3 Drawing Sheets

(56) References Cited

U.S. PATENT DOCUMENTS

| | | | | |
|---|---|---|---|---|
| 2017/0175675 A1* | 6/2017 | Sabnis | .................... | F01D 15/12 |
| 2017/0211484 A1* | 7/2017 | Sheridan | .................... | F02C 3/00 |
| 2017/0284220 A1* | 10/2017 | Roberge | .................... | F02C 7/36 |
| 2017/0298766 A1* | 10/2017 | Ertas | .................... | F16C 17/047 |
| 2018/0230854 A1* | 8/2018 | Parnin | .................... | B01D 27/142 |
| 2019/0153978 A1* | 5/2019 | Dievart | .................... | F02C 7/06 |
| 2021/0040893 A1* | 2/2021 | Finke | .................... | F02C 7/36 |

OTHER PUBLICATIONS

B737theory, "N1 and N2 explained". Nov. 12, 2016. XP002801820, Retrieved from the Internet: URL:https://www.facebook.com/B737Theory/posts/n1-and-n2-explainedthe-cfm56-7b27-is-a-high-bypass-51-ratio-turbofan-engine-and/1425181157510496/ [retrieved on Jan. 25, 2021].

* cited by examiner

GAS TURBINE ENGINE

BACKGROUND

SUMMARY

The present disclosure relates to a gas turbine engine, a method of operating a gas turbine engine at idle and a method of designing a gas turbine engine.

Key drivers for turbofan gas turbine engines for aircraft propulsion are overall efficiency and power output or thrust. Gas turbine engines spend the majority of their operational life, and consume the most fuel, at cruise conditions. Therefore designing for cruise conditions can be an important driver of gas turbine design. However other operational states can also influence the design of the engine.

At idle, especially in larger gas turbine engines, the gas turbine is not operating in a condition that many of the components have been designed or optimised for. This can cause issues with wear and heat management in components, for example, bearings and gears. For example at low load, bearings may experience skidding and/or sub-optimal oil distribution. As the size of the engine increases, the gas turbine components experience greater wear and heat management issues at idle.

A general problem to be addressed therefore is how to provide improved management of thermal loads and wear in components at idle.

According to a first aspect there is provided a gas turbine engine comprising a low pressure shaft and a high pressure shaft; wherein the low pressure shaft connects a fan to a fan drive turbine, and the high pressure shaft connects a high pressure turbine to a compressor section. The low pressure shaft and the high pressure shaft are arranged such that when operating at idle, the idle shaft speed ratio is greater than 6.05. The idle shaft speed ratio is the ratio of the rotational speed of the high pressure shaft to the rotational speed of the low pressure shaft at idle conditions.

According to a second aspect there is provided a method of operating a gas turbine engine at idle, wherein the gas turbine engine comprises a low pressure shaft and a high pressure shaft, and wherein the low pressure shaft connects a fan to a fan drive turbine, and the high pressure shaft connects a high pressure turbine to a compressor section. The method comprises operating a first shaft at a first rotational speed and a second shaft at a second rotational speed such that the idle, shaft speed ratio is greater than 6.05.

According to a third aspect there is provided a method of designing a gas turbine engine, wherein the gas turbine engine comprises a low pressure shaft and a high pressure shaft, and wherein the low pressure shaft connects a fan to a fan drive turbine, and the high pressure shaft connects a high pressure turbine to a compressor section. The method comprises setting the rotational speed of the low pressure shaft at idle and setting the rotational speed of the high pressure shaft at idle such that the idle shaft speed ratio is greater than 6.05. The method comprises connecting the low pressure shaft to a low pressure shaft thrust bearing and connecting the high pressure shaft to a high pressure shaft thrust bearing.

The idle shaft speed ratio may be greater than 6.44. The idle shaft speed ratio may be less than 9.0. The idle shaft speed ratio may be less than 8.3.

The idle shaft speed ratio may be 6.05, 6.44, 7, 7.35, 7.68, 8.12, 8.3, 8.6 or 9. The idle shaft speed ratio may be between two of the above values, for example greater than 6.05 and less than 8.12, or for example greater than 6.44 and less than 8.3.

The fan may be connected to the fan drive turbine through a power gearbox. The power gearbox may provide a geared architecture.

The power gearbox may comprise a gear ratio greater than 3.1. The power gearbox may comprise a gear ratio less than 3.8. The power gearbox may comprise a gear ratio between 3.2 and 3.7.

The low pressure shaft may be supported on a thrust bearing. The thrust bearing may be axially aligned with the low pressure compressor. The thrust bearing may be axially forward of the low pressure compressor. The thrust bearing may be axially forward or rearward of the power gearbox.

The low pressure thrust may have a first thrust bearing and a second thrust bearing. The first thrust bearing may be forward of the power gearbox. The second thrust bearing may be rearward of the power gearbox.

The high pressure shaft may be supported on a thrust bearing. The high pressure shaft thrust bearing may be axially aligned with the high pressure compressor, for example axially aligned with the forward axial position or blade of the high pressure compressor. The high pressure thrust bearing may be forward of the high pressure compressor.

One or more thrust bearings may be ball bearings or roller thrust bearings.

The flow of oil to one or more bearings and/or components may be proportional to the speed of the high pressure shaft.

The flow of oil to the one or more bearings and/or components may be supplied by one or more pumps. The one or more pumps may be mechanically linked and/or driven off to high pressure shaft.

The gas turbine engine may further comprise an auxiliary gearbox. The auxiliary gearbox may be driven off the high pressure shaft.

The high pressure shaft may connect a high pressure shaft to a high pressure compressor. The low pressure shaft may connect a fan drive turbine to a fan and a low pressure compressor. The low pressure compressor may rotate at the same speed as the fan drive turbine, for example when a power gearbox is present. The gas turbine engine may comprise two shafts. The gas turbine engine may comprise less than three shafts. The gas turbine engine may comprise two or less turbine sections (for example a fan drive turbine and a high pressure turbine) and two or less compressor sections (for example a high pressure compressor and a low pressure compressor).

The idle shaft speed ratio may be more than three times the cruise shaft speed ratio. The idle shaft speed ratio may be more than four times the cruise shaft speed ratio.

The cruise shaft speed ratio may be the ratio of the speed of the high pressure shaft to the speed of the low pressure shaft at cruise conditions.

The fan diameter may be greater than 230 cm. The fan diameter may be less than 400 cm. The fan diameter may be between 240 and 280 cm. The fan diameter may be greater than 330 cm.

The gas turbine engine may have a thrust greater than 180 kN. The gas turbine engine may have a thrust less than 400 kN. The gas turbine engine may have a thrust between 200 kN and 300 kN. The gas turbine may have a thrust greater than 330 kN.

The gas turbine may have a specific thrust at cruise of less than 110 $Nkg^{-1}s$. The gas turbine may have a specific thrust at cruise of less than 90 Nkg$^{-1}$s. The gas turbine may have a specific thrust at cruise of less than 85 Nkg$^{-1}$s. The gas turbine may have a specific thrust at cruise less than 100 Nkg$^{-1}$s. The gas turbine may have a specific thrust at cruise between 100 Nkg$^{-1}$s and 60 Nkg$^{-1}$s.

The fan may comprise less than 20 fan blades. The fan may comprise 18 fan blades.

The gas turbine engine may have a bypass ratio greater than 12. The gas turbine engine may have a bypass ratio less than 18. The gas turbine engine may have a bypass ratio between 13 and 16.

Advantageously, by increasing the idle shaft speed ratio the low pressure shaft can rotate at a comparatively lower speed and/or the high pressure shaft can rotate at a comparatively higher speed at idle (compared to a lower idle shaft speed ratio). This may provide more optimal conditions for the components, for example the bearings and gears, at idle.

For example at idle the thrust bearing(s) will have low load, compared to power operation (for example max take off or cruise conditions), due to the low axial thrust the engine is producing at idle compared to power operation.

The difference between bearing load at power operation compared to idle will be greater for the one or more thrust bearings on the low pressure shaft, compared to the thrust bearing(s) on the high pressure shaft. This is because the one or more low pressure shaft thrust bearings react more axial thrust at power because they react axial thrust from the fan. Therefore the one or more thrust bearings on the low pressure shaft are operating further from their designed axial load at idle and are more affected, for example by wear and heat management (for example caused by skidding and/or sub-optimal oil distribution), by idle operation. As the engine size increases, this effect increases, as there is an even larger difference between thrusts at power and thrusts at idle.

Therefore advantageously, by providing the claimed thrust idle shaft speed ratio, the overall impact of idle operation on the wear and life of the bearings is improved. For example by rotating the low pressure shaft slower compared to the high pressure shaft, the impact of idle operation on the wear and life on the one or more bearings on the low pressure shaft, which are more affected by idle operation, is improved. For example a slower rotating bearing is less likely to experience wear from skidding and/or sub-optimal oil distribution effects when at low load.

Further, if the pump for the oil delivery to the bearings is driven directly off the high pressure shaft, then by increasing the idle shaft speed ratio a greater amount of oil can be delivered to the bearings to manage heat loads from the bearings at idle.

However if the oil delivery is too high then the oil churn within the bearings can reduce cooling efficiency. Further, cooling efficiency is also reduced at higher oil flows because of the lower temperature differences between the bearings and the heat sink. Increasing the idle shaft speed ratio reduces the low pressure shaft speed and therefore the flow of air through the bypass, and therefore cooling from surface oil coolers. The claimed idle shaft speed ratios provide an optimum cooling arrangement at idle.

By improving the heat management and wear management conditions of the components and bearings at idle they can be optimised for performance and weight.

The difference in speed may be enabled by a geared engine (comprising a power gearbox) and/or a larger fan and/or configuration of the shafts (for example compressor and/or turbine blade design or arrangement) such that at idle the speed ratio is achieved. The claimed idle shaft speed ratios may be particularly advantageous for the claimed gas turbine parameters.

The ratio of shaft speeds at idle is often much greater than the ratio of shaft speeds at other operating conditions, such as cruise or climb, for a given engine. The idle shaft speed ratio may be greater than the cruise shaft speed ratio. The cruise shaft speed ratio may be the ratio of the high pressure shaft speed to the low speed shaft speed at cruise.

Idle, or idle conditions, may be defined as operating the engine at around 4% of maximum take-off thrust at ISA sea level pressure and temperature conditions+15° C. At idle conditions the engine may be operating at a minimum steady state thrust under ISA sea level pressure and temperature conditions+15° C.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The power gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The power gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.10, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform. The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 240 cm to 280 cm or 330 cm to 380 cm.

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 240 cm to 280 cm or 250 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.30, 0.31, 0.32, 0.33, 0.34, 0.35, 0.36, 0.37, 0.38, 0.39 or 0.4 (all units in this paragraph being $Jkg^{-1}K^{-1}/(ms^{-1}))^2$). The fan tip loading may be in an inclusive range bounded by any two of the values in the previous sentence (i.e. the values may form upper or lower bounds), for example in the range of from 0.28 to 0.31, or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of form 12 to 16, 13 to 15, or 13 to 14. The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70.

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80

Nkg$^{-1}$s. The specific thrust may be in an inclusive range bounded by any two of the values in the previous sentence (i.e. the values may form upper or lower bounds), for example in the range of from 80 Nkg$^{-1}$s to 100 Nkg$^{-1}$s, or 85 Nkg$^{-1}$s to 95 Nkg$^{-1}$s. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 330 kN to 420 kN, for example 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds), for example in the range of from 1800K to 1950K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance—between top of climb and start of descent. Cruise conditions thus define an operating point of the gas turbine engine that provides a thrust that would ensure steady state operation (i.e. maintaining a constant altitude and constant Mach Number) at mid-cruise of an aircraft to which it is designed to be attached, taking into account the number of engines provided to that aircraft. For example where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to an operating point of the engine that provides a known required thrust level (for example a value in the range of from 30 kN to 35 kN) at a forward Mach number of 0.8 and standard atmospheric conditions (according to the International Standard Atmosphere) at an altitude of 38000 ft (11582 m). Purely by way of further example, the cruise conditions may correspond to an operating point of the engine that provides a known required thrust level (for example a value in the range of from 50 kN to 65 kN) at a forward Mach number of 0.85 and standard atmospheric conditions (according to the International Standard Atmosphere) at an altitude of 35000 ft (10668 m).

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

According to an aspect, there is provided an aircraft comprising a gas turbine engine as described and/or claimed herein. The aircraft according to this aspect is the aircraft for which the gas turbine engine has been designed to be attached.

Accordingly, the cruise conditions according to this aspect correspond to the mid-cruise of the aircraft, as defined elsewhere herein.

According to an aspect, there is provided a method of operating a gas turbine engine as described and/or claimed herein. The operation may be at the cruise conditions as defined elsewhere herein (for example in terms of the thrust, atmospheric conditions and Mach Number).

According to an aspect, there is provided a method of operating an aircraft comprising a gas turbine engine as described and/or claimed herein. The operation according to this aspect may include (or may be) operation at the mid-cruise of the aircraft, as defined elsewhere herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION OF EXEMPLARY EMBODIMENTS

Figure 1:
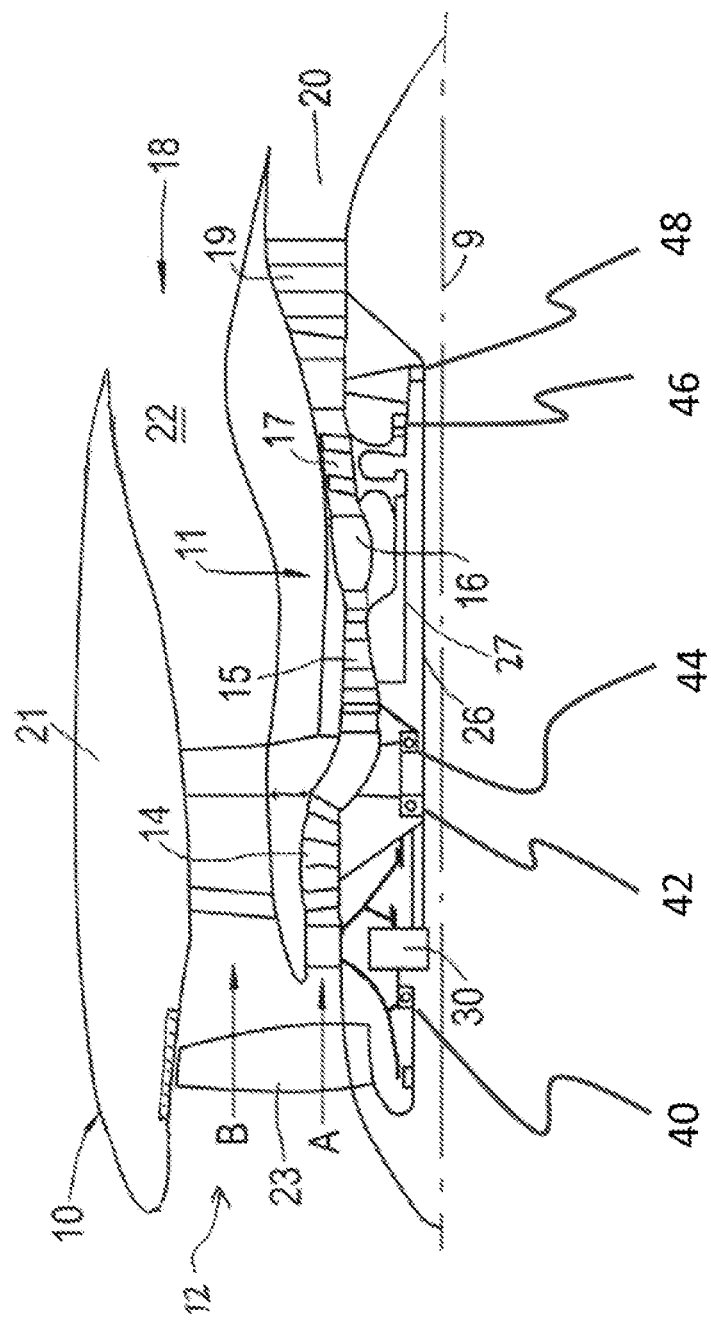
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a low pressure shaft 26 and an epicyclic power gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a high pressure shaft 27. The fan 23 generally provides the majority of the propulsive thrust. The epicyclic gearbox 30 is a reduction gearbox.

The low pressure shaft 26 is supported on bearings, for example bearings 40 and 42. The high pressure shaft 27 is also supported on bearings, for example bearings 44.

At idle conditions the high pressure shaft 27 rotates at a faster speed than the low pressure shaft 26. Table 1 below shows the shaft speeds for three engine configurations.

TABLE 1

Shaft speeds for engines 1, 2 and 3 at idle and cruise

|  |  | Engine 1 | Engine 2 | Engine 3 (prior art) |
|---|---|---|---|---|
| idle | Low pressure shaft speed (rpm) | 1700 | 1300 | 3800 |
|  | High pressure shaft speed (rpm) | 10500 | 8500 | 6500 |
| cruise | Low pressure shaft speed (rpm) | 8000 | 8000 | 8000 |
|  | High pressure shaft speed (rpm) | 16000 | 13000 | 12000 |

Both the high pressure shaft 27 and the low pressure shaft 26 are supported on a thrust bearing and a roller bearing. In FIG. 1 the low pressure shaft 26 has two thrust bearings 40 and 42, one either side (forward and rearward) of the geared arrangement 30. In other examples there may be only one thrust bearing on the low pressure shaft (for example either thrust bearing 40 or thrust bearing 42). In other examples the second thrust bearing 40 may be rearwards of the gear arrangement 30, for example connected to the fan by a shaft radially inside the gear arrangement 30. In other examples the first thrust bearing 42 may be forwards of the gear arrangement 30. The high pressure shaft 27 is supported on thrust bearing 44. The low pressure shaft 26 is supported on roller bearing 46 and the higher pressure shaft is supported on roller bearing 48. In the FIG. 1 example the thrust bearings are roller bearings, however in other examples the thrust bearings may be of different type that can react axial thrust, for example roller thrust bearings or needle thrust bearings.

The difference in loading of the bearings, between power operations and idle, is greater for the thrust bearings 40, 42, 44 compared to the roller bearings 46, 48. The thrust bearings 40 and 42 will be the highest loaded bearings, since they react the axial thrust from the fan 23 and the low pressure turbine 19. Power operations may be when the gas turbine is generating axial thrust for forward propulsion, for example at max take-off or cruise. The difference in loading of the bearings, between power operations and idle, is greater for the thrust bearings 40, 42 on the low pressure shaft 26 compared to the thrust bearings 40 on the high pressure shaft 27. By providing the claimed idle shaft speed ratio each bearing is operating in more optimal conditions at idle.

A power offtake (not shown) may take power from the high pressure shaft 27, for example to power an auxiliary gearbox, in a conventional manner. One or more pumps may be driven from the higher pressure shaft 27 in a conventional manner. Each bearing requires a supply of oil for heat management and lubrication. The pump(s) supply oil to the bearings. The one or more pump's output may be proportional to the speed of the high pressure shaft 27. The pump(s) may pump oil to one or more bearings, for example one or more of bearings 40, 42, 44, 46 or 48. Each of the one or more pumps may supply oil to one or more bearings, for example two, three, four or five bearings, or for example bearings in the same bearing chamber. For example in one arrangement, five pumps each provide oil to one bearing. In another arrangement, three pumps are present, whereby two of the pumps provide oil to two bearings and the third pump provide oil to one bearing. In another arrangement, one pump provides oil to all bearings.

Figure 2:
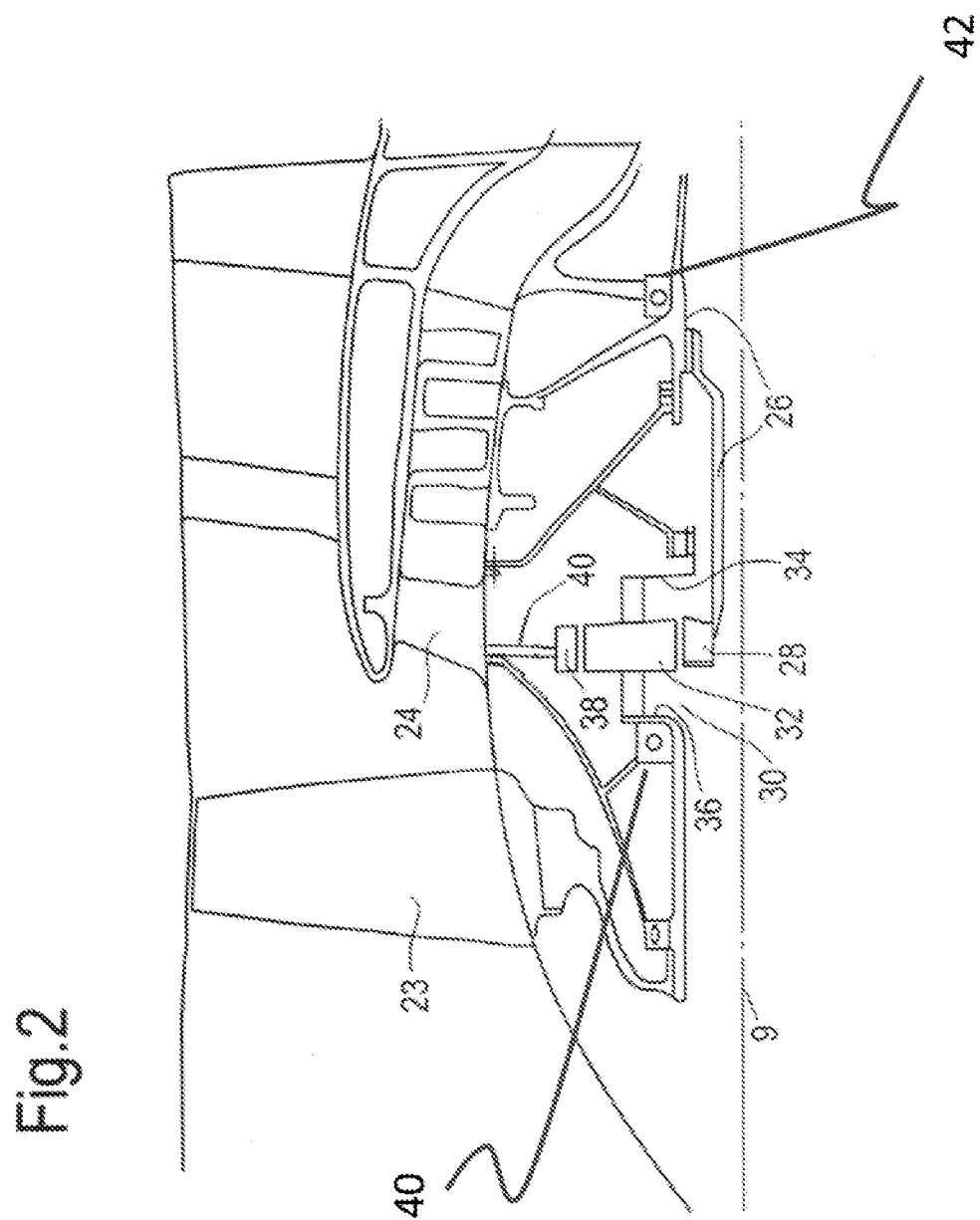
FIG. 2 is a close up sectional side view of an upstream portion of a gas turbine engine.

The geared fan gas turbine engine 10 is shown in FIG. 2. The low pressure turbine 19 (see FIG. 1) drives the low pressure shaft 26, which is coupled to a sun wheel, or sun gear, 28 of the epicyclic gear arrangement 30. The low pressure shaft 26 is supported on bearings, for example bearings 40 and 42. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
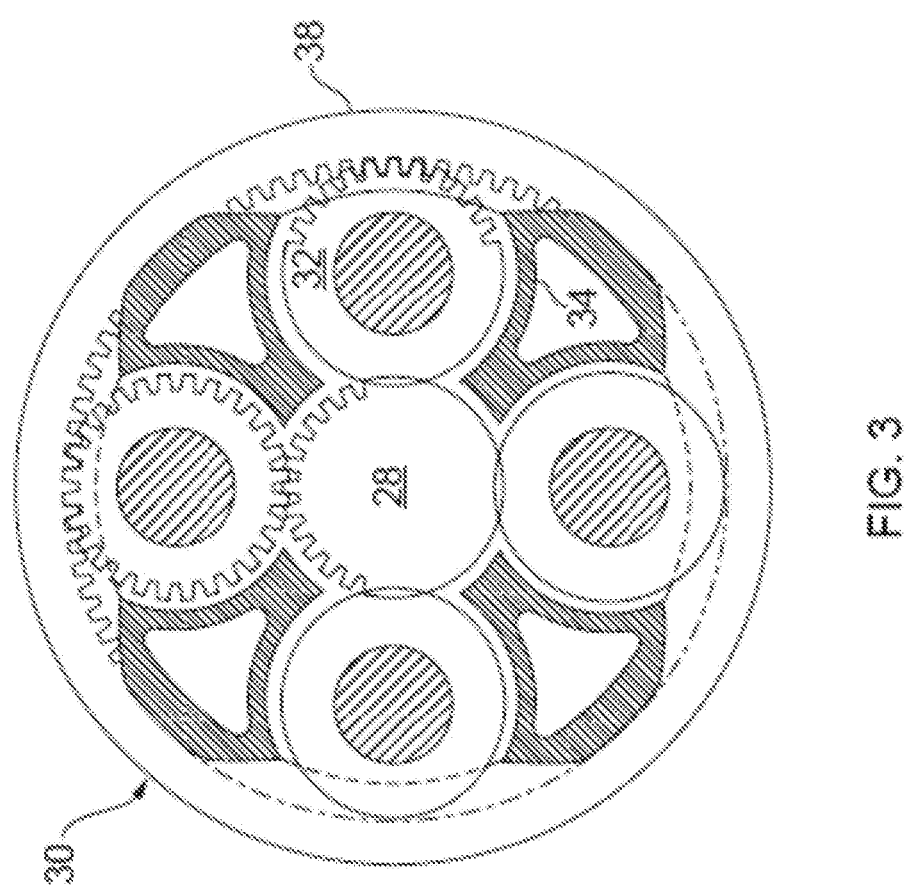
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A gas turbine engine comprising:
   a low pressure shaft that connects a fan to a fan drive turbine, the low pressure shaft including:
      an input shaft that connects a power gearbox to the fan drive turbine; and
      an output shaft that connects the power gearbox to the fan; and
   a high pressure shaft that connects a high pressure turbine to a compressor section;
   wherein the low pressure shaft and the high pressure shaft are arranged such that when operating at idle, an idle shaft speed ratio is in a range of 6.05 to 9.0, the idle shaft speed ratio being a ratio of a speed of the high pressure shaft to a speed of the input shaft at idle conditions.

2. The gas turbine engine according to claim 1, wherein the idle shaft speed ratio is greater than 6.44.

3. The gas turbine engine according to claim 1, wherein the idle shaft speed ratio is less than 8.3.

4. The gas turbine engine according to claim 1, wherein the power gearbox comprises a gear ratio greater than 3.1.

5. The gas turbine engine according to claim 1, wherein at least one of the output shaft and the input shaft is supported on a thrust bearing, and the thrust bearing is axially aligned with fan drive turbine.

6. The gas turbine engine according to claim 1, wherein at least one of:
   the output shaft is supported on a thrust bearing located axially forward of the power gearbox, and
   the input shaft is supported on a thrust bearing located axially rearward of the power gearbox.

7. The gas turbine engine according to claim 1, wherein a flow of oil to one or more bearings and/or components is proportional to the speed of the high pressure shaft.

8. The gas turbine engine according to claim 1, wherein the idle shaft speed ratio is more than three times a cruise shaft speed ratio; and wherein
   the cruise shaft speed ratio is the ratio of the speed of the high pressure shaft to the speed of the input shaft at cruise conditions.

9. The gas turbine engine according to claim 1, wherein a fan diameter is greater than 230 cm.

10. The gas turbine according to claim 1, wherein the gas turbine engine has a thrust greater than 180 kN.

11. The gas turbine according to claim 1, wherein the gas turbine engine has a specific thrust at cruise of less than 110 Nkg 1s.

12. The gas turbine according to claim 1, wherein the fan comprises less than 20 fan blades.

13. The gas turbine according to claim 1, wherein the gas turbine engine has a bypass ratio greater than 12.

14. A method of operating a gas turbine engine at idle, wherein the gas turbine engine comprises a low pressure shaft and a high pressure shaft, the low pressure shaft connecting a fan to a fan drive turbine and including an input shaft that connects a power gearbox to the fan drive turbine and an output shaft that connects the power gearbox to the fan, and the high pressure shaft connecting a high pressure turbine to a compressor section, the method comprising:
   operating the engine at idle such that an idle shaft speed ratio is in a range of 6.05 to 9.0, the idle shaft speed ratio being a ratio of a speed of the high pressure shaft to a speed of the input shaft at idle conditions.

15. The method according to claim 14, wherein the idle shaft speed ratio is greater than 6.44.

16. A method of designing a gas turbine engine, comprising:
   connecting a fan to a fan drive turbine with a low pressure shaft, the low pressure shaft including:
      an input shaft that connects a power gearbox to the fan drive turbine; and
      an output shaft that connects the power gearbox to the fan; and
   connecting a high pressure turbine to a compressor section with a high pressure shaft; and
   arranging the input shaft, the fan drive turbine, the high pressure shaft, and the high pressure turbine so that an idle shaft speed ratio is in a range of 6.05 to 9.0, the idle shaft speed ratio being a ratio of a speed of the high pressure shaft to a speed of the input shaft at idle conditions;
   connecting at least one of the input shaft and the output shaft to a low pressure shaft thrust bearing; and
   connecting the high pressure shaft to a high pressure shaft thrust bearing.

17. The method according to claim 16, wherein the idle shaft speed ratio is greater than 6.44.

18. The method according to claim 16, wherein the low pressure shaft thrust bearing is axially aligned with the fan drive turbine.

19. The method according to claim 16, the low pressure shaft thrust bearing is axially forward of the fan drive turbine, and axially forward or rearward of the power gearbox.

* * * * *